(12) United States Patent
Kuroba et al.

(10) Patent No.: US 11,794,724 B2
(45) Date of Patent: Oct. 24, 2023

(54) ESTIMATION DEVICE AND STRADDLE-TYPE VEHICLE

(71) Applicant: HONDA MOTOR CO., LTD., Tokyo (JP)

(72) Inventors: Yoshiyuki Kuroba, Tokyo (JP); Kazuki Akami, Tokyo (JP); Hiroshi Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 17/695,602

(22) Filed: Mar. 15, 2022

(65) Prior Publication Data

US 2022/0203963 A1 Jun. 30, 2022

Related U.S. Application Data

(63) Continuation of application No. PCT/JP2019/038561, filed on Sep. 30, 2019.

(51) Int. Cl.
*B60W 30/045* (2012.01)
*B60W 40/09* (2012.01)
*B60W 40/112* (2012.01)
*B60W 40/114* (2012.01)

(52) U.S. Cl.
CPC .......... *B60W 30/045* (2013.01); *B60W 40/09* (2013.01); *B60W 40/112* (2013.01); *B60W 40/114* (2013.01); *B60W 2300/36* (2013.01)

(58) Field of Classification Search
CPC .. B60W 30/045; B60W 40/09; B60W 40/112; B60W 40/114; B60W 2300/36; B60W 40/10; B60W 2520/00; B60W 30/09; B60W 2520/14; B60W 2520/18; B60W 2552/30; B60W 30/02; B62J 99/00
See application file for complete search history.

(56) References Cited

U.S. PATENT DOCUMENTS 11,155,272 B2   10/2021   Shimizu

FOREIGN PATENT DOCUMENTS

| JP | 2001-219881 A | 8/2001 |
|---|---|---|
| JP | 2007-271298 A | 10/2007 |
| JP | 2009-23485 A | 2/2009 |
| JP | 2012-66683 A | 4/2012 |
| JP | 2016-68769 A | 5/2016 |
| JP | 2017-144888 A | 8/2017 |

OTHER PUBLICATIONS

International Search Report dated Dec. 3, 2019, issued in counterpart International Application No. PCT/JP2019/038561, with English Translation. (5 pages).

*Primary Examiner* — Jeff A Burke
*Assistant Examiner* — Sihar A Karwan
(74) *Attorney, Agent, or Firm* — WHDA, LLP

(57) ABSTRACT

A device detects a behavior of a straddle-type vehicle in a yaw direction and in a roll direction, determines whether a traveling state of the straddle-type vehicle is a first state or a second state closer to a straight traveling state than the first state, and estimates a turning radius of the straddle-type vehicle. In a case where it is determined that the traveling state is the first state, a turning radius is estimated by a first method based on a detection result of the behavior in the yaw direction. In a case where it is determined that the traveling state is the second state, the turning radius is estimated by a second method based on a detection result of the behavior in the roll direction.

5 Claims, 8 Drawing Sheets

ESTIMATION DEVICE AND STRADDLE-TYPE VEHICLE

CROSS-REFERENCE TO RELATED APPLICATION(S)

This application is a Continuation of International Patent Application No. PCT/JP2019/038561, filed Sep. 30, 2019, the entire disclosure of which is incorporated herein by reference.

BACKGROUND OF THE INVENTION

Field of the Invention

The present invention relates to a technique for estimating a turning radius of a straddle-type vehicle.

Description of the Related Art

Information on a self-vehicle position and a traveling locus of a vehicle is used, for example, for driving assistance of the vehicle. There is known a technique for estimating a turning radius of a vehicle and using the estimated turning radius in estimating a self-vehicle position and a traveling locus of the vehicle. In order to estimate the turning radius of the vehicle, a sensor that detects the behavior of the vehicle in a yaw direction, which is represented by a yaw rate sensor, is used and is widely used in four-wheeled vehicles (Japanese Patent Laid-Open No. 2017-144888).

When the technique for estimating a turning radius that is used in four-wheeled vehicles is applied to a straddle-type vehicle, the estimation accuracy of the turning radius is not necessarily high during straight traveling in some cases. The straddle-type vehicle has unique vehicle body behavior that four-wheeled vehicles do not have and that minute left and right turns repeatedly occur due to the inclination of a vehicle body in a roll direction even while the straddle-type vehicle is traveling straight. It is considered that the sensor that detects the behavior of the vehicle in the yaw direction represented by the yaw rate sensor does not completely capture this minute turn.

SUMMARY OF THE INVENTION

An object of the present invention is to improve estimation accuracy of a turning radius of a straddle-type vehicle.

According to an aspect of the present invention, there is provided an estimation device comprises: a first detection unit configured to detect a behavior of a straddle-type vehicle in a yaw direction; a second detection unit configured to detect a behavior of the straddle-type vehicle in a roll direction, a determination unit configured to determine whether a traveling state of the straddle-type vehicle is a first state or a second state closer to a straight traveling state than the first state; and an estimation unit configured to estimate a turning radius of the straddle-type vehicle, wherein in a case where the determination unit determines that the traveling state is the first state, the estimation unit estimates a turning radius of the straddle-type vehicle by a first method based on a detection result of the first detection unit, in a case where the determination unit determines that the traveling state is the second state, the estimation unit estimates the turning radius of the straddle-type vehicle by a second method different from the first method, and the second method is a method of estimating the turning radius of the straddle-type vehicle on the basis of a detection result of the second detection unit.

Further features of the present invention will become apparent from the following description of exemplary embodiments (with reference to the attached drawings).

DESCRIPTION OF THE EMBODIMENTS

Figure 1:
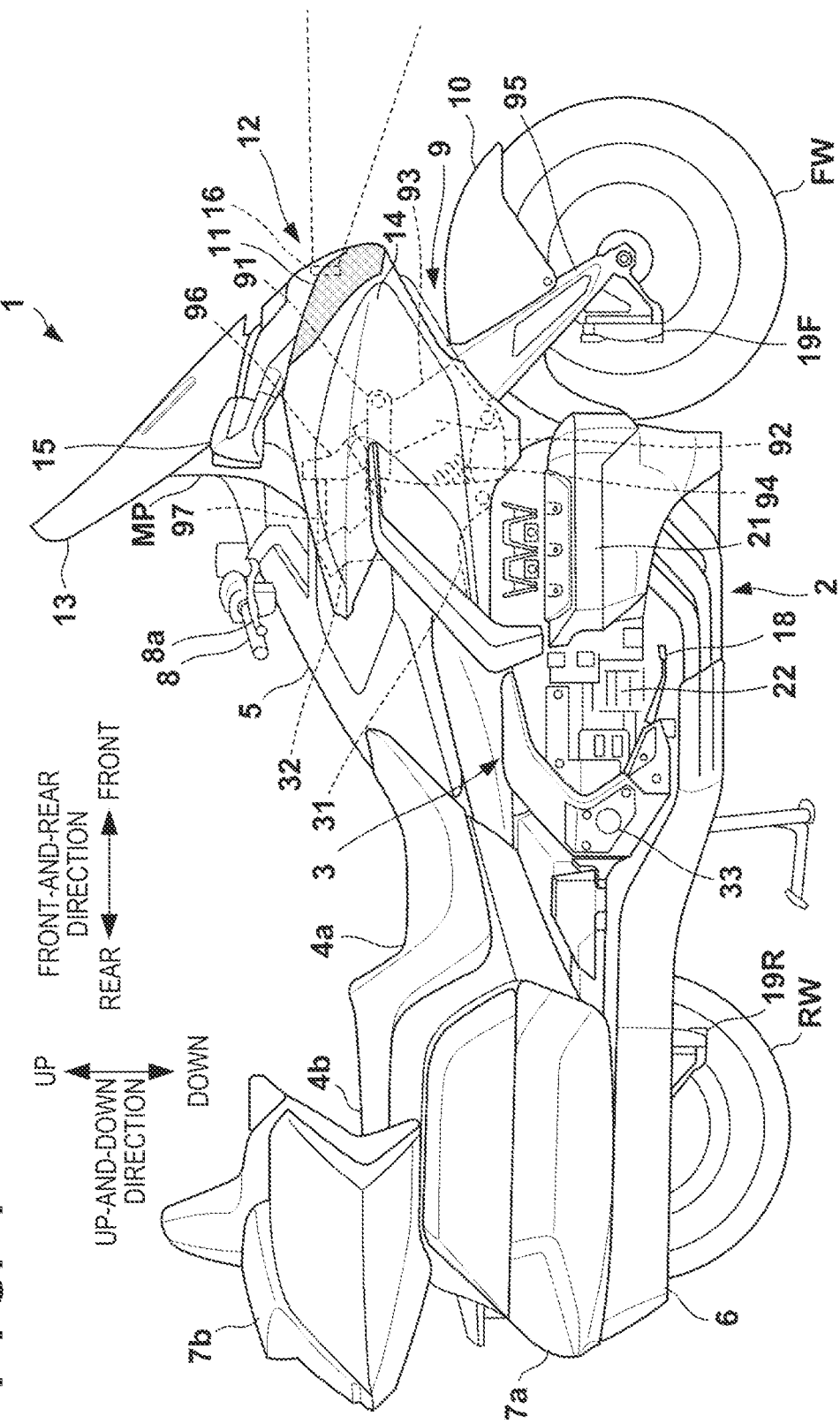
FIG. 1 is a side view of the right side of a straddle-type vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Outline of Straddle-Type Vehicle>

Figure 2:
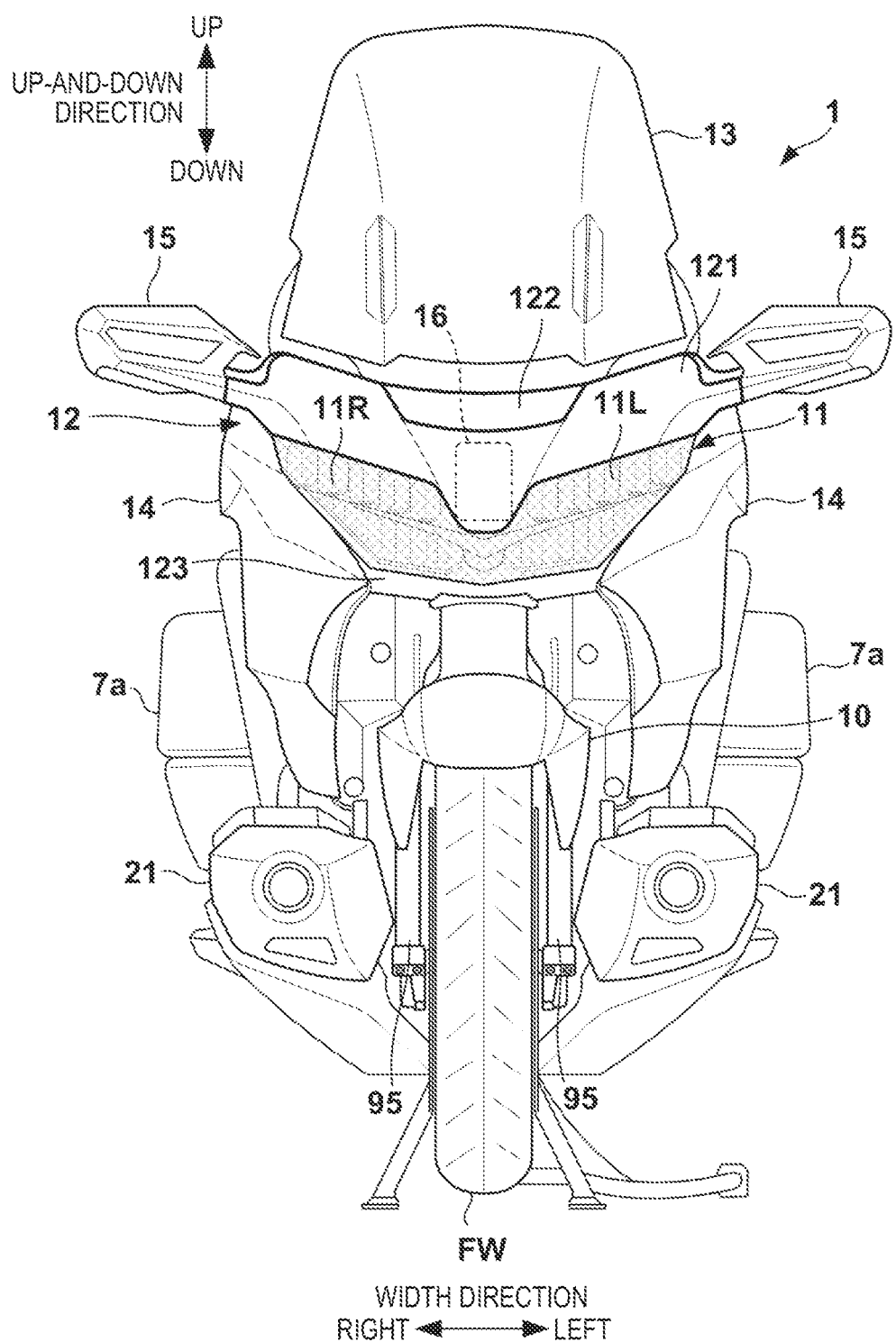
FIG. 2 is a front view of the straddle-type vehicle of FIG. 1.

FIG. 1 is a side view of the right side of a straddle-type vehicle 1 according to an embodiment of the present invention, and FIG. 2 is a front view of the straddle-type vehicle 1.

The straddle-type vehicle 1 is a two-wheeled motorcycle suitable for a long distance movement, but the present invention is applicable to various straddle-type vehicles including other types of motorcycles and is also applicable to an electric vehicle using a motor as a drive source in addition to a vehicle using an internal combustion engine as a drive source. Hereinafter, the straddle-type vehicle 1 may be referred to as the vehicle 1.

The vehicle 1 includes a power unit 2 between a front wheel FW and a rear wheel RW. In the present embodiment, the power unit 2 includes a horizontally opposed six-cylinder engine 21 and a transmission 22. The driving force of the transmission 22 is transmitted to the rear wheel RW via a drive shaft (not illustrated) to rotate the rear wheel RW.

The power unit 2 is supported by a vehicle body frame 3. The vehicle body frame 3 includes a pair of left and right main frames 31 extended in an X direction. A fuel tank 5 and an air cleaner box (not illustrated) are disposed above the main frames 31. A meter panel MP that displays various types of information to a rider is provided in front of the fuel tank 5.

A head pipe 32 that pivotably supports a steering shaft (not illustrated) that is rotated by a handle 8 is provided at a front-side end part of the main frame 31. A pair of left and right pivot plates 33 is provided at a rear end part of the main frame 31. A lower end part of the pivot plate 33 and a front end part of the main frame 31 are connected by a pair of left and right lower arms (not illustrated), and the power unit 2 is supported by the main frame 31 and the lower arms. A pair of left and right seat rails (not illustrated) extending rearward is provided at the rear end part of the main frame 31, and the seat rails support a seat 4a on which the rider is to be seated, a seat 4b on which a passenger is to be seated, a rear trunk 7b, and the like.

A front end part of a rear swing arm (not illustrated) extending in a front-and-rear direction is swingably supported by the pivot plate 33. The rear swing arm is swingable in an up-and-down direction, and the rear wheel RW is supported at a rear end part of the rear swing arm. An exhaust muffler 6 that muffles the exhaust of the engine 21 is extended in the X direction on the lower lateral side of the rear wheel RW. Left and right saddle bags 7a are provided on the upper lateral side of the rear wheel RW.

A front suspension mechanism 9 that supports the front wheel FW is formed at the front end part of the main frame 31. The front suspension mechanism 9 includes an upper link 91, a lower link 92, a fork support 93, a cushion unit 94, and a pair of left and right front forks 95.

The upper link 91 and the lower link 92 are each disposed at the front end part of the main frame 31 with an interval therebetween in the up-and-down direction. A rear end part of each of the upper link 91 and the lower link 92 is swingably connected to the front end part of the main frame 31. A front end part of each of the upper link 91 and the lower link 92 is swingably connected to the fork support 93. The upper link 91 and a lower link 92 extend in the front-and-rear direction and are disposed substantially in parallel.

The cushion unit 94 has a structure in which a shock absorber is inserted through a coil spring, and an upper end part of the cushion unit 94 is swingably supported by the main frame 31. A lower end part of the cushion unit 94 is swingably supported by the lower link 92.

The fork support 93 has a tubular shape and is inclined rearward. A front end part of the upper link 91 is pivotably connected to an upper front part of the fork support 93. The front end part of the lower link 92 is pivotably connected to a lower rear part of the fork support 93.

In the fork support 93, a steering shaft 96 is supported so as to be rotatable about an axis of the steering shaft 96. The steering shaft 96 has a shaft part (not illustrated) which is inserted through the fork support 93. A bridge (not illustrated) is provided at a lower end part of the steering shaft 96, and the pair of left and right front forks 95 is supported by the bridge. The front wheel FW is rotatably supported by the front fork 95. An upper end part of the steering shaft 96 is connected to a steering shaft (not illustrated) rotated by the handle 8 via a link 97. The steering shaft 96 is rotated by the steering of the handle 8, and the front wheel FW is steered. An upper part of the front wheel FW is covered with a fender 10, and the fender 10 is supported by the front fork 95.

The vehicle 1 includes a brake device 19F that brakes the front wheel FW and a brake device 19R that brakes the rear wheel RW, and the brake devices 19F and 19R are configured to be operable by the operation of a brake lever 8a or a brake pedal 18 by the rider. The brake devices 19F and 19R are, for example, disc brakes.

A headlight unit 11 that emits light to a front of the vehicle 1 is disposed in a front part of the vehicle 1. The headlight unit 11 according to the present embodiment is a two-eye type headlight unit including symmetrically a light irradiation unit 11R on the right side and a light irradiation unit 11L on the left side. However, a headlight unit of a one-eye type or a three-eye type or a headlight unit of a bilaterally asymmetric two-eye type can also be employed.

The front part of the vehicle 1 is covered with a front cover 12, and a side part of a front side of the vehicle 1 is covered with a pair of left and right side covers 14. A screen 13 is disposed above the front cover 12. The screen 13 is a windshield that reduces wind pressure applied to the rider during traveling and is formed of, for example, a transparent resin member. A pair of left and right side mirror units 15 is disposed on a lateral side of the front cover 12. In the side mirror unit 15, a side mirror (not illustrated) for the rider to visually recognize the rear is supported.

The front cover 12 includes cowl members 121 to 123, and the cowl members 121 to 123 constitute a front cowl. The cowl member 121 extends in a Y direction to constitute a main body of the front cover 12, and the cowl member 122 constitutes an upper part of the cowl member 121. The cowl member 123 is disposed while being apart from the cowl member 121 in a down direction.

An opening for exposing the headlight unit 11 is formed between the cowl member 121 and the cowl member 123 and between the pair of left and right side covers 14, the cowl member 121 defines an upper edge of the opening, the cowl member 123 defines a lower edge thereof, and the side covers 14 define left and right side edges thereof.

A detection unit 16 that detects a situation of the front of the vehicle 1 is disposed behind the front cover 12. In the case of the present embodiment, the detection unit 16 is a radar (for example, a millimeter wave radar), but may be another type of sensor that can detect the front through the front cover 12. In a case where an obstacle is detected in front of the vehicle 1 by the detection unit 16, for example, a display for calling attention to the rider can be displayed on the meter panel MP, or the brake devices 19F and 19R can be automatically operated to decelerate the vehicle 1.

<Control Device>

Figure 3:
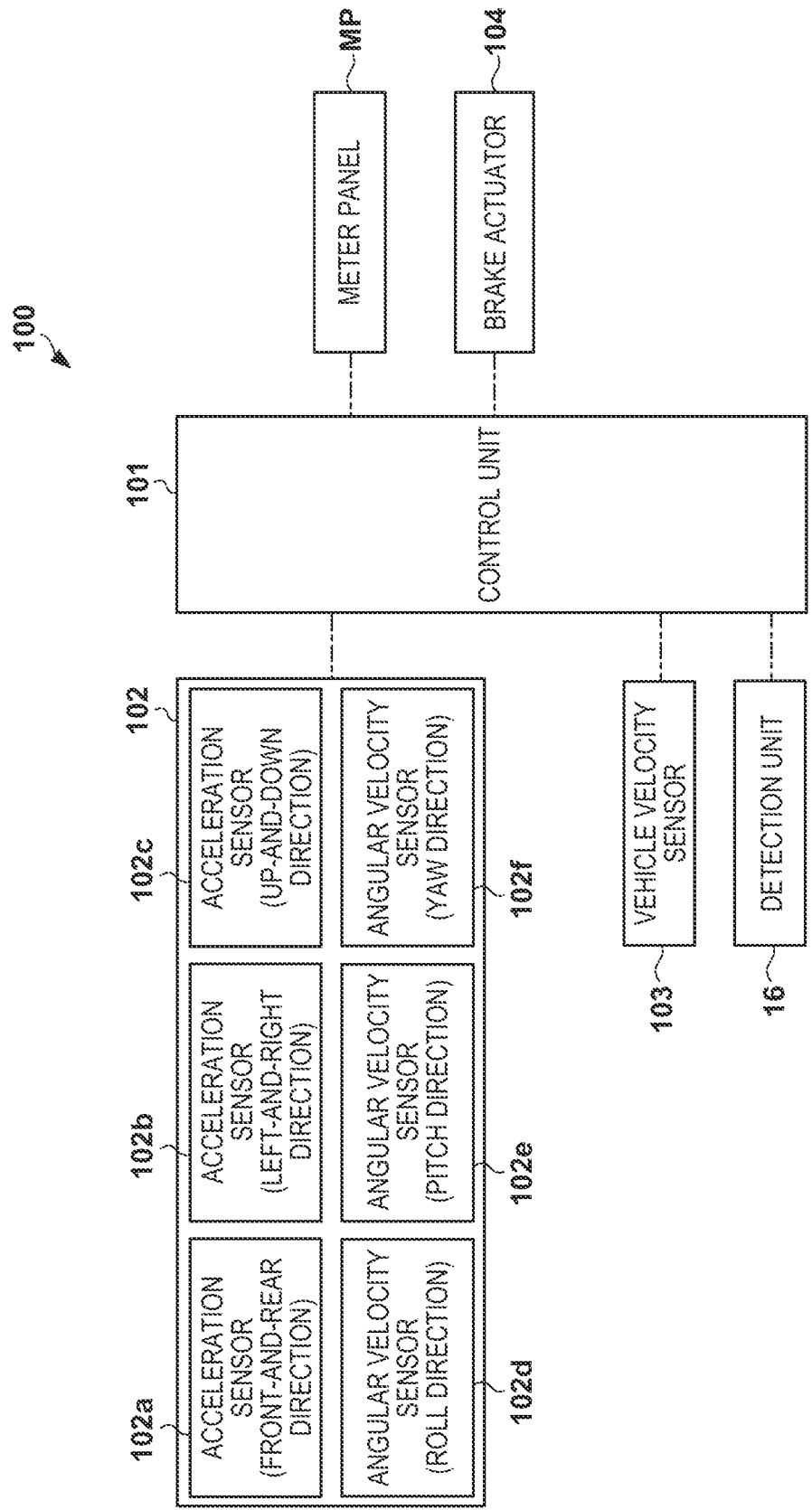
FIG. 3 is a block diagram of a control device.

FIG. 3 is a block diagram of a control device 100 of the vehicle 1, and only necessary configurations are illustrated in relation to description to be described later. A control unit 101 includes a processor represented by a central processing unit (CPU), a storage device such as a semiconductor memory, an input/output interface with an external device, a communication interface, or the like. In the storage device, programs executed by the processor, data used for processing performed by the processor, and the like are stored. The control unit 101 may include a plurality of processors, storage devices, interfaces, and the like. Note that the number of control units 101 and functions to be assigned can be designed as appropriate.

An inertial measurement unit (IMU) 102 is a sensor unit that detects the behavior of the vehicle 1 and is disposed, for example, near the center of gravity of the vehicle 1. In the case of the present embodiment, the IMU 102 includes acceleration sensors 102a to 102c that detect acceleration in the front-and-rear direction, left-and-right direction, and up- and -down direction of the vehicle 1, and angular velocity sensors 102d to 102f that detect angular velocities in the roll direction, pitch direction, and yaw direction of the vehicle 1.

The vehicle velocity sensor 103 detects a vehicle velocity of the vehicle 1. The vehicle velocity sensor 103 is, for example, a sensor that is supported by the front fork 95 and detects a rotation amount of the front wheel FW. A brake actuator 104 is a device that operates the brake devices 19F and 19R and is, for example, a hydraulic device.

<Control Example>

Figure 4:
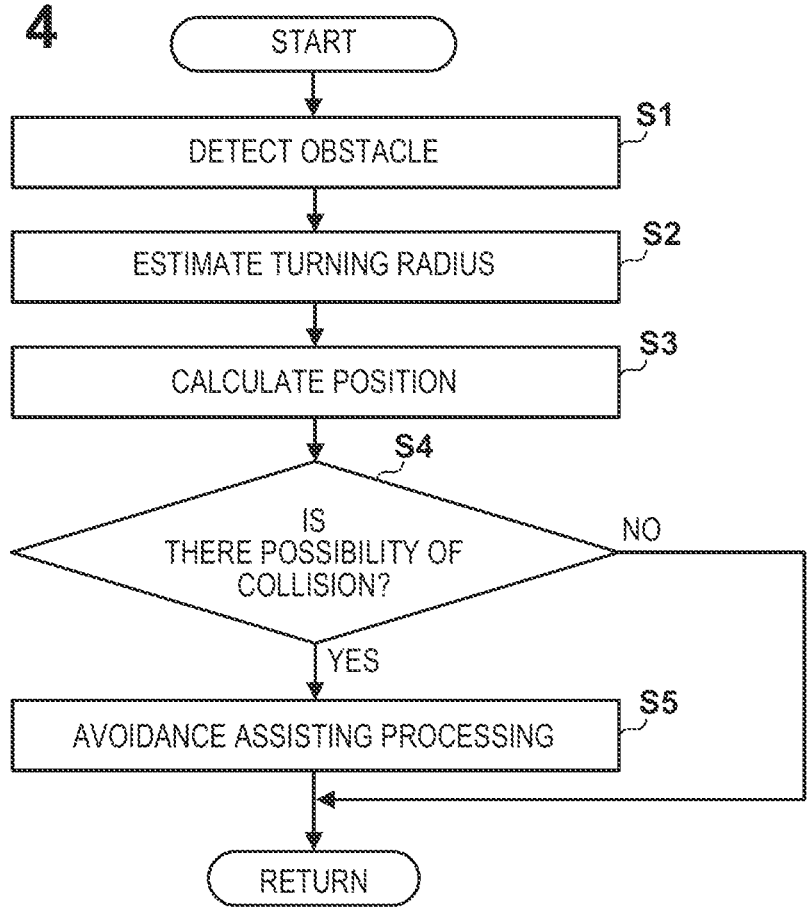
FIG. 4 is a flowchart illustrating an example of processing executed by a processor of a control unit 101.

A control example executed by the processor of the control unit 101 will be described. FIG. 4 is a flowchart of the control example. The illustrated example illustrates an example of processing of assisting collision avoidance in a case where an obstacle is detected in front of the vehicle 1 during traveling, and the processing is periodically executed.

Figure 5:
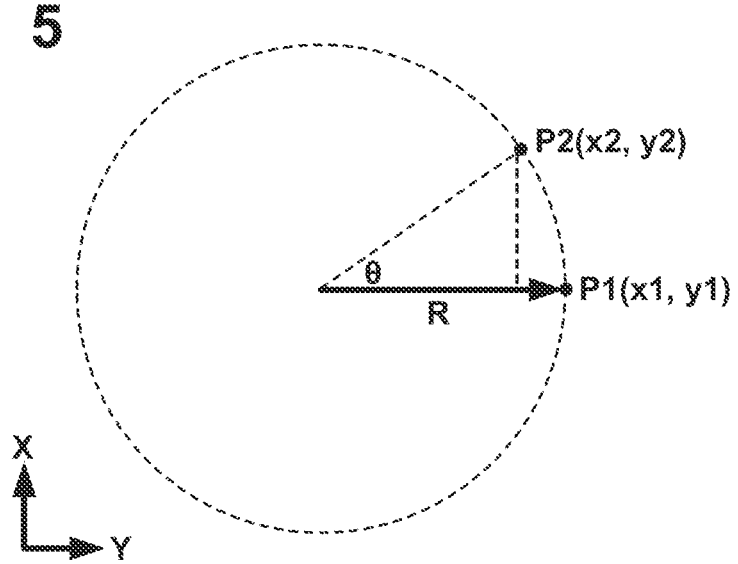
FIG. 5 is an explanatory graph illustrating an example of a vehicle position estimating method.

In S1, an obstacle existing in front of the vehicle 1 is detected from a detection result of the detection unit 16. In S2, a turning radius of the vehicle 1 is estimated. Details will be described later. In S3, a position of the vehicle 1 after predetermined time is calculated from the turning radius estimated in S2. FIG. 5 is an explanatory graph illustrating an example of the processing. When a current position of the vehicle in X-Y plane coordinates is P1 (x1, y1), a position after predetermined time t is P2 (x2, y2), the turning radius of the vehicle 1 is R, the angular velocity in the yaw direction is θ', and the vehicle velocity is V, these can be expressed by the following:

$x1=R$ $y1=0$ $x2=R \times \cos\theta$ $y2=R \times \sin\theta$ $\theta = \theta' \times t \text{(or} = (V/R) \times t)$ Returning to FIG. 4, in S4, on the basis of the estimated position of the obstacle detected in S1 and the estimated position (P2) of the vehicle 1 after the predetermined time in S3, it is determined whether there is a possibility that the vehicle 1 will collide with the obstacle. In a case where there is a possibility of collision, the processing proceeds to S5, and in a case where there is no possibility of collision, the processing ends.

In S5, avoidance assisting processing is performed. Here, for example, the possibility of collision with the obstacle is displayed on the meter panel MP and notified to the rider. The notification may be by voice. In addition, as another example of processing, the brake actuator 104 is driven to operate the brake devices 19F and 19R to decelerate the vehicle 1. Then, the processing ends.

Next, an example of processing of estimating the turning radius in S2 of FIG. 5 will be described with reference to FIG. 6. That is, the control device 100 also functions as an estimation device that estimates the turning radius. In general, a straddle-type vehicle repeatedly takes minute left and right turns due to inclination of a vehicle body in a roll direction even while traveling straight. The minute turns are not reliably captured by a sensor, which is represented by a yaw rate sensor (angular velocity sensor 102f in the present embodiment), that detects the behavior of the vehicle in a yaw direction. Therefore, in the present embodiment, the turning radius is estimated by a different method according to a traveling state of the vehicle 1.

In S11, a detection result of a sensor is acquired. Here, detection results of at least the angular velocity sensor 102d in the roll direction, the angular velocity sensor 102f in the yaw direction, and the vehicle velocity sensor 103 are acquired. The acquired detection results are stored in the storage device of the control unit 101. Detection results for a plurality of times of processing are stored in the storage device in chronological order.

In S12, the traveling state (in other words, a traveling posture) of the vehicle 1 is determined. Here, the traveling state of the vehicle 1 is distinguished into two traveling states: a traveling state A and a traveling state B. The traveling state A is a traveling state represented by steady turning and is a state in which the vehicle 1 is turning while being inclined. The traveling state B is a state closer to a straight traveling state than the traveling state A. In the case of the present embodiment, the traveling state B is a state in which the vehicle 1 is traveling straight in a posture substantially close to an upright posture.

Figure 7:
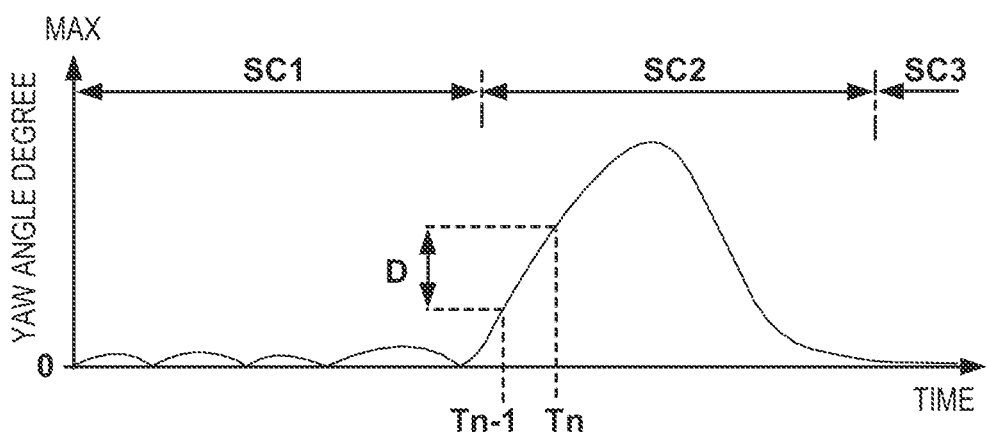
FIG. 7 is an explanatory graph illustrating an example of determination of a traveling state.

The traveling state is determined, for example, on the basis of a change amount of an angle in the yaw direction. FIG. 7 is an explanatory graph of the determination. The angle in the yaw direction is obtained by integrating the detection results (yaw angular velocity) of the angular velocity sensor 102f. In FIG. 7, a vertical axis represents the angle (absolute value) in the yaw direction. A difference D between an angle in the yaw direction at time Tn and an angle in the yaw direction at time Tn−1 that is one unit period before the time Tn is the change amount of the angle in the yaw direction. When a change amount D (absolute value) is not less than a threshold value, it is determined that the traveling state is the traveling state A, and when the change amount D is less than the threshold value, it is determined that the traveling state is the traveling state B. In an example of FIG. 7, it is determined that the traveling states in a period SC1 and a period SC3 are the traveling state B and that the traveling state in a period SC2 is the traveling state A.

Figure 11:
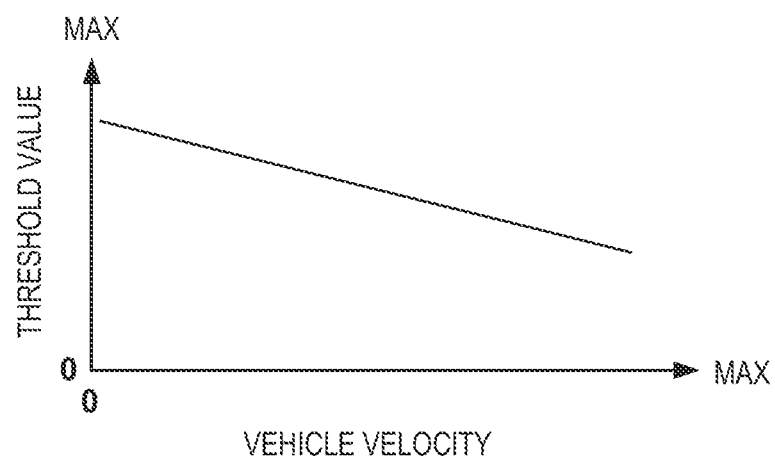
FIG. 11 is an explanatory graph illustrating an example of a threshold value that changes according to a vehicle velocity.

The unit period and the threshold value can be appropriately set by an experiment or the like. The threshold value may be a value that is changed according to the vehicle velocity of the vehicle 1. FIG. 11 illustrates an example of the threshold value, and the threshold value is relatively large at a low vehicle velocity and relatively small at a high vehicle velocity. In a case where the vehicle velocity is high, the traveling straightness of the vehicle 1 increases, and therefore, the threshold value is set to be small.

Figure 8:
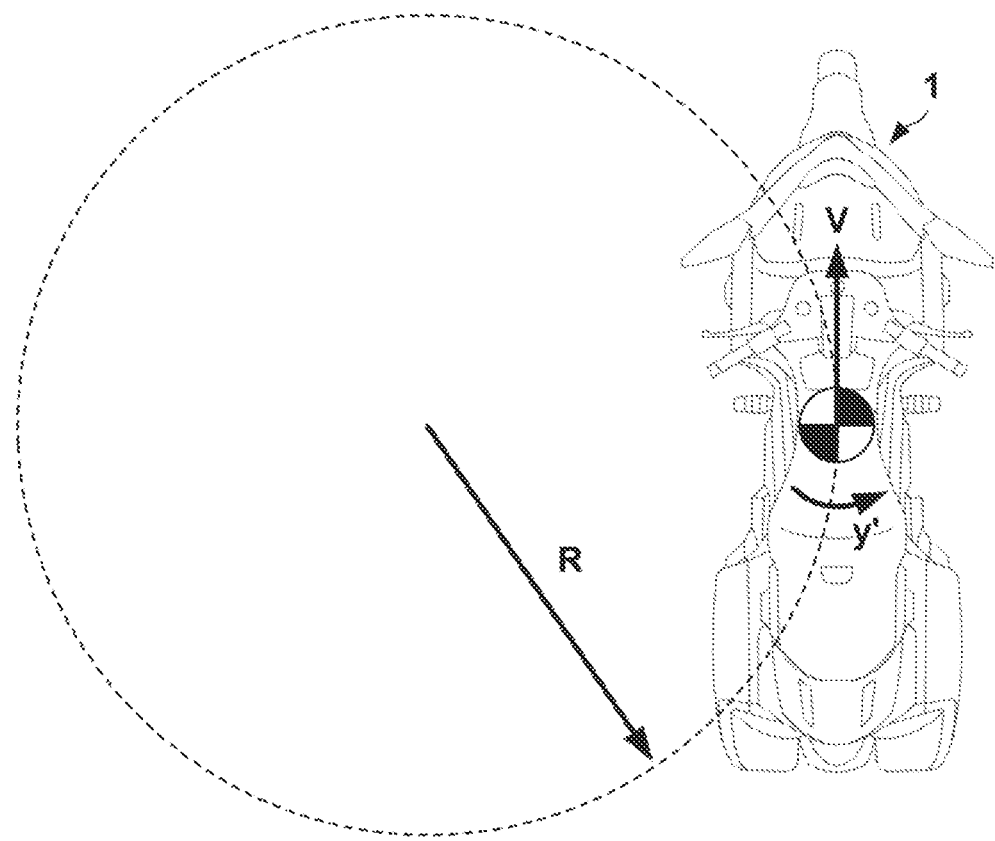
FIG. 8 is an explanatory view illustrating a method of calculating a turning radius.

Returning to FIG. 6, in a case where it is determined that the traveling state is the traveling state A in S12, the processing proceeds to S13, and in a case where it is determined that the traveling state is the traveling state B, the processing proceeds to S14. In S13, a turning radius R is calculated using the detection result of the angular velocity sensor 102f. FIG. 8 is an explanatory view of the calculation. In a case where it is determined that the traveling state is the traveling state A, in the case of the present embodiment, the turning radius R is calculated according to the turning radius R=a vehicle velocity V/a yaw angular velocity θy' on the basis of the steady circle turning model. The turning radius R may be an average value of results of a plurality of times of calculations and may be a value updated for each of the plurality of times of calculations.

Figure 9:
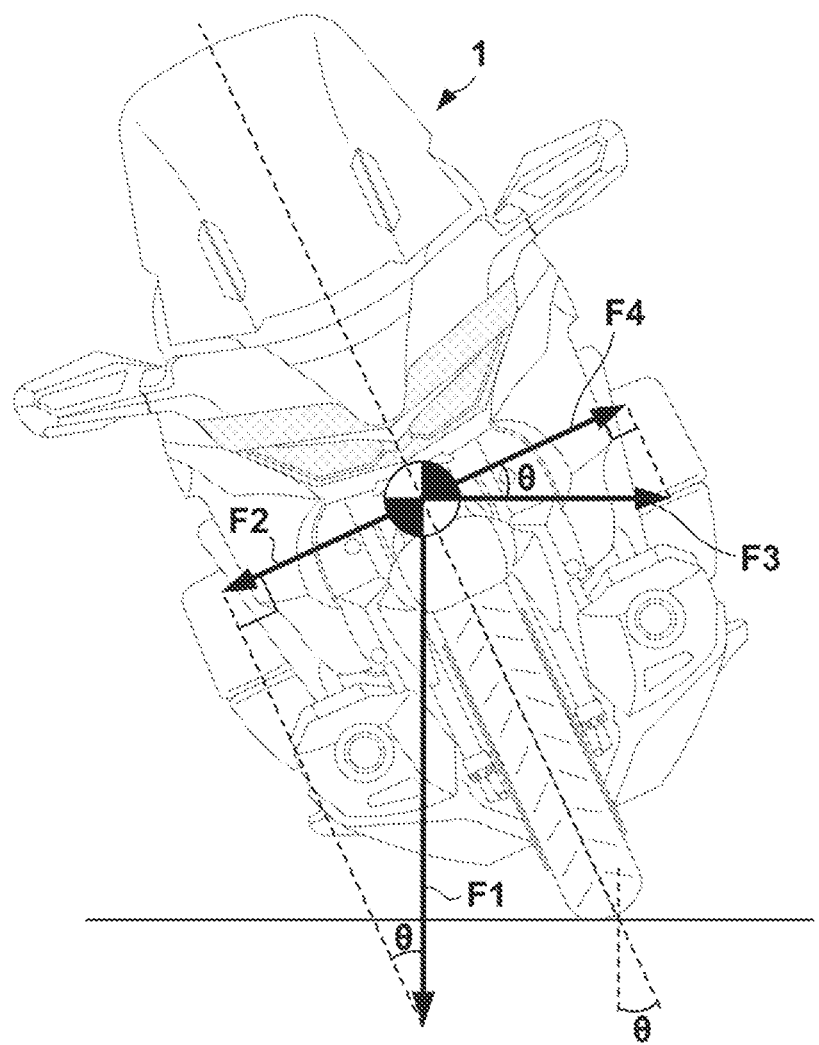
FIG. 9 is an explanatory view illustrating another method of calculating a turning radius.

In S14, the turning radius R is calculated using the detection result of the angular velocity sensor 102d. FIG. 9 is an explanatory view of the calculation. In a case where it is determined that the traveling state is the traveling state B, the turning radius R is calculated on the basis of the mechanical bank angle model. In the illustrated example, a bank angle θ is obtained by integrating the detection results (roll angular velocity) of the angular velocity sensor 102d. When a total mass of the vehicle 1 is m and gravitational acceleration is g, gravity F1 acting on the vehicle 1 is F1=mg. When the vehicle velocity is V, centrifugal force F3 acting on the vehicle 1 is F3=(mV²)/R. Component force F2 in a direction of making the vehicle 1 fall down is F2=F1× sin θ=mg×sin θ. Component force F4 in a direction of raising the vehicle 1 is F4=F3×cos θ={(mV²)/R}×cos θ.

From balance between the component force F2 and the component force F4, mg×sin θ={(mV²)/R}×cos θ is established. Therefore, the turning radius R is calculated according to the turning radius R=V²/(g×tan θ). The turning radius R may be an average value of results of a plurality of times of calculations and may be a value updated for each of the plurality of times of calculations.

Figure 6:
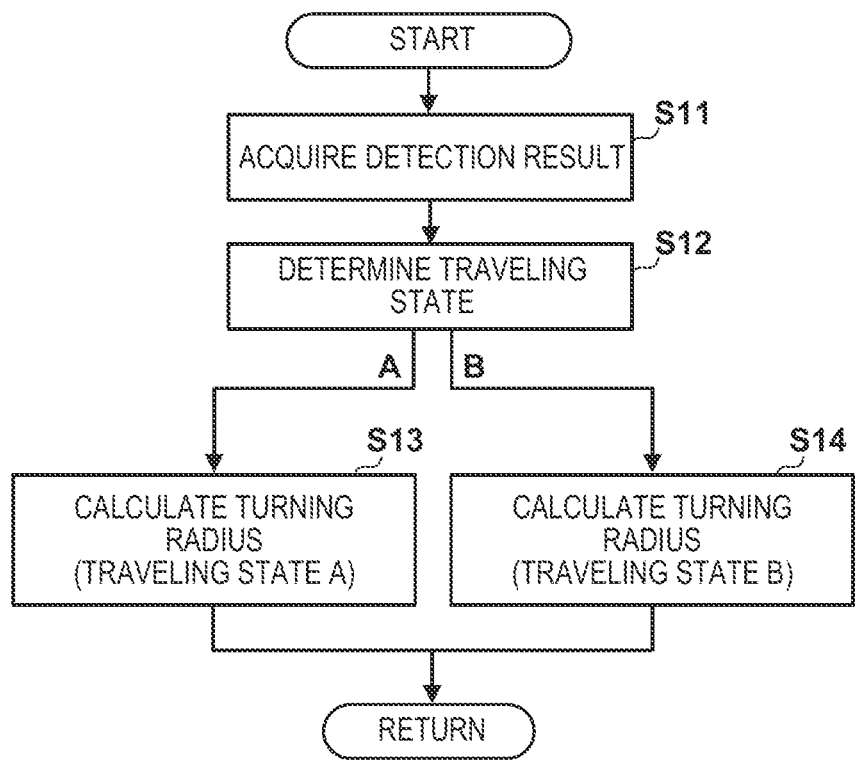
FIG. 6 is a flowchart illustrating an example of processing executed by the processor of the control unit 101.
Figure 10:
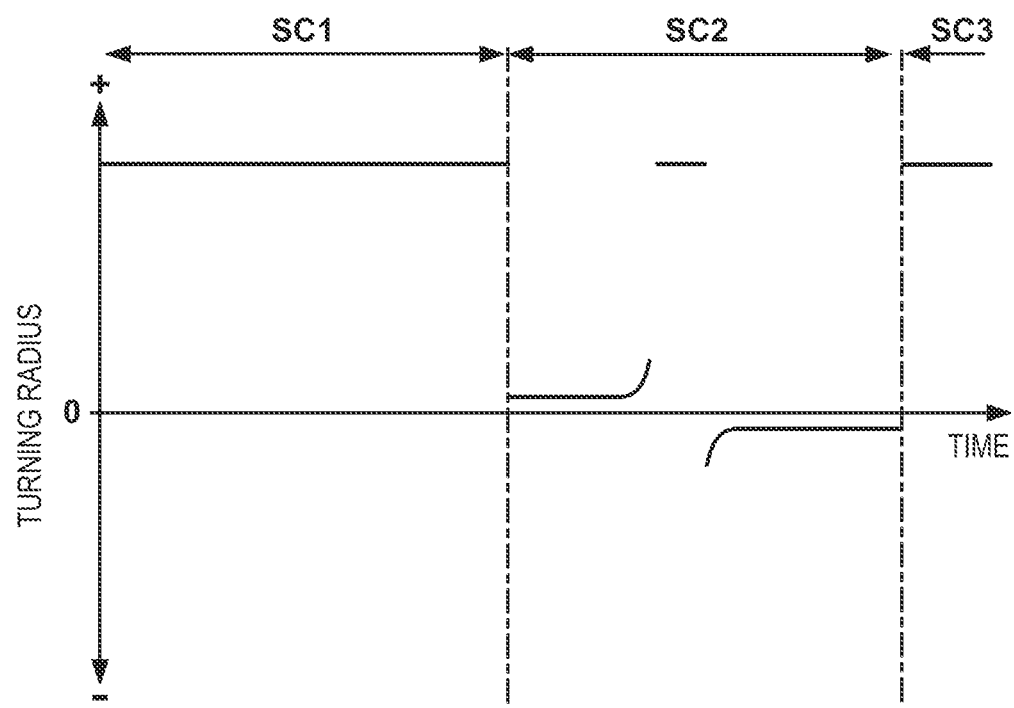
FIG. 10 is an explanatory graph illustrating an estimation result of a turning radius in the example of FIG. 6.

FIG. 10 illustrates an example of changes in the turning radius R in the case of an example of FIG. 6. In FIG. 10, a vertical axis represents the turning radius, and + and − mean distinction between left and right directions. In the periods SC1 and SC3 in which the traveling state is close to the straight traveling state, the turning radius becomes large. In the period SC2 in which the traveling state is close to a steady turning state, the turning radius changes from being small on a + side to being large and then to being small on a − side.

As described above, in the present embodiment, the traveling state of the vehicle 1 is determined, and in the case of the traveling state B in which the estimation accuracy of the turning radius based on the detection result of the angular velocity sensor 102*f* decreases, the turning radius of the vehicle 1 is estimated by another method, whereby the estimation accuracy can be improved. In addition, in the case of the traveling state B, the estimation accuracy can be improved by calculating the turning radius of the vehicle 1 on the basis of the mechanical bank angle model.

Other Embodiments

In the above embodiment, in the case of the traveling state B, the turning radius of the vehicle 1 is calculated on the basis of the mechanical bank angle model, but the present invention is not limited thereto, and other methods can be adopted. For example, since the traveling state B is a state in which the vehicle 1 is substantially traveling straight, the turning radius may be set to a predetermined fixed value (for example, a significantly large value). Setting the turning radius to the fixed value eliminates the need for a sensor or the like for detecting the bank angle and can reduce a calculation load.

Next, in the above embodiment, the traveling state of the vehicle 1 is determined on the basis of the change amount of the angle in the yaw direction, but the traveling state may be determined on the basis of map information on a traveling path of the vehicle 1. For example, when the traveling road is a straight road, it can be determined that the traveling state is the traveling state B, and when the traveling path is a curve, it can be determined that the traveling state is the traveling state A. The map information may be stored in the storage device of the control unit 101 or may be acquired from a server by communication. A current position of the vehicle 1 on a map may be recognized by providing a GPS sensor.

Next, in the above embodiment, the estimation result of the turning radius of the vehicle 1 is used for the position estimation of the vehicle 1 for avoiding a collision with the obstacle, but the present invention is not limited thereto. For example, the estimation result may be used for the position estimation of the vehicle 1 in automatic acceleration/deceleration control of the vehicle 1 in automatic cruise in which the vehicle 1 follows a preceding vehicle.

Summary of Embodiments

The above embodiments disclose at least the following estimation device or straddle-type vehicle.
1. An estimation device (100) of the embodiment comprises:
    a first detection unit (102*f*) configured to detect a behavior of a straddle-type vehicle (1) in a yaw direction;
    a determination unit (S12) configured to determine whether a traveling state of the straddle-type vehicle is a first state or a second state closer to a straight traveling state than the first state; and
    an estimation unit (S13, S14) configured to estimate a turning radius of the straddle-type vehicle, wherein
    in a case where the determination unit determines that the traveling state is the first state, the estimation unit (S13, S14) estimates a turning radius of the straddle-type vehicle by a first method based on a detection result of the first detection unit (S13), and
    in a case where the determination unit determines that the traveling state is the second state, the estimation unit (S13, S14) estimates the turning radius of the straddle-type vehicle by a second method different from the first method (S14).

According to this embodiment, the traveling state of the straddle-type vehicle is determined, and in the case of a traveling state in which the estimation accuracy of the turning radius based on the detection result of the first detection unit decreases, the turning radius of the straddle-type vehicle is calculated by another method, whereby the estimation accuracy can be improved.

2. In the estimation device (100) of the embodiment, the determination unit (S12) calculates a change amount (D) of a yaw angle of the straddle-type vehicle in a unit period on the basis of the detection result of the first detection unit (102*f*), and compares the change amount (D) with a threshold value to determine whether the traveling state of the straddle-type vehicle is the first state or the second state.

According to this embodiment, the traveling state of the straddle-type vehicle can be grasped relatively easily. In addition, the first detection unit can also be used.

3. The estimation device (100) of the embodiment further comprises a second detection unit (102*d*) configured to detect a behavior of the straddle-type vehicle in a roll direction,
    wherein the second method is a method of estimating the turning radius of the straddle-type vehicle on the basis of a detection result of the second detection unit (S14).

According to this embodiment, the estimation accuracy can be improved by estimating the turning radius of the straddle-type vehicle on the basis of the dynamic bank angle model.

4. In the estimation device (100) of the embodiment, the second method is a method of setting the turning radius of the straddle-type vehicle to a predetermined fixed value.

According to this embodiment, it is possible to reduce the number of sensors and a calculation load.

5. The estimation device (100) of the embodiment further comprises a third detection unit (103) configured to detect a vehicle velocity of the straddle-type vehicle, wherein the estimation unit estimates the turning radius of the straddle-type vehicle on the basis of a detection result of the third detection unit in both the first method and the second method.

According to this embodiment, the turning radius of the straddle-type vehicle can be estimated using the vehicle velocity.

6. In the estimation device (100) of the embodiment, the threshold value is a value that is changed according to a vehicle velocity of the straddle-type vehicle.

According to this embodiment, the traveling state of the straddle-type vehicle can be determined in consideration of the vehicle velocity.

7. The straddle-type vehicle (1) of the embodiment comprises the estimation device (100).

According to this embodiment, the traveling state of the straddle-type vehicle is determined, and in the case of a traveling state in which the estimation accuracy of the turning radius based on the detection result of the first detection unit decreases, the turning radius of the straddle-type vehicle is calculated by another method, whereby the estimation accuracy can be improved.

8. The straddle-type vehicle (1) of the embodiment further comprises a calculation unit (S3) configured to calculate a position of the straddle-type vehicle after predetermined time on the basis of a turning radius of the straddle-type vehicle estimated by the estimation device.

According to this embodiment, the position of the straddle-type vehicle can be estimated.

The embodiments of the invention have been described above, The invention is not limited to the foregoing embodiments, and various variations/changes are possible within the spirit of the invention. Therefore, to apprise the public of the scope of the present invention, the following claims are made.

What is claimed is:

1. A control device comprises:
a first sensor configured to detect an angular velocity of a straddle-type vehicle in a yaw direction;
a second sensor configured to detect an angular velocity of the straddle-type vehicle in a roll direction;
a storage device configured to store detection results of the first sensor and the second sensor; and
at least one processor configured to
determine whether a traveling state of the straddle-type vehicle is a first state or a second state closer to a straight traveling state than the first state based on a detection result of the first sensor stored in the storage device;
estimate a turning radius of the straddle-type vehicle;
calculate a position of the straddle-type vehicle after predetermined time on the basis of an estimated turning radius of the straddle-type vehicle; and
automatically operate a brake device to decelerate the straddle-type vehicle based on an estimated position of the straddle-type vehicle,
wherein
in a case where it is determined that the traveling state is the first state, a turning radius of the straddle-type vehicle is estimated by a first method based on a detection result of the first sensor stored in the storage device,
in a case where it is determined that the traveling state is the second state, the turning radius of the straddle-type vehicle is estimated by a second method different from the first method, and
the second method is a method of estimating the turning radius of the straddle-type vehicle on the basis of a detection result of the second sensor stored in the storage device.

2. The control device according to claim 1, wherein the storage device is configured to store detection results of the first sensor and the second sensor for a plurality of times of processing in chronological order,
the at least one processor
calculates a change amount of a yaw angle of the straddle-type vehicle in a unit period on the basis of detection results of the first sensor stored in the storage device, and
compares the change amount with a threshold value to determine whether the traveling state of the straddle-type vehicle is the first state or the second state.

3. The control device according to claim 2, wherein the threshold value is a value that is changed according to a vehicle velocity of the straddle-type vehicle.

4. The control device according to claim 1, further comprising a third sensor configured to detect a vehicle velocity of the straddle-type vehicle, wherein
the storage device is configured to store a detection result of the third sensor,
the at least one processor estimates the turning radius of the straddle-type vehicle on the basis of a detection result of the third sensor stored in the storage device in both the first method and the second method.

5. A straddle-type vehicle comprising:
a first sensor configured to detect an angular velocity of a straddle-type vehicle in a yaw direction;
a second sensor configured to detect an angular velocity of the straddle-type vehicle in a roll direction;
a storage device configured to store detection results of the first sensor and the second sensor; and
at least one processor configured to:
determine whether a traveling state of the straddle-type vehicle is a first state or a second state closer to a straight traveling state than the first state based on a detection result of the first sensor stored in the storage device;
estimate a turning radius of the straddle-type vehicle;
calculate a position of the straddle-type vehicle after predetermined time on the basis of an estimated turning radius of the straddle-type vehicle; and
automatically operate a brake device to decelerate the straddle-type vehicle based on an estimated position of the straddle-type vehicle,
wherein
in a case where it is determined that the traveling state is the first state, a turning radius of the straddle-type vehicle is estimated by a first method based on a detection result of the first sensor stored in the storage device,
in a case where it is determined that the traveling state is the second state, the turning radius of the straddle-type vehicle is estimated by a second method different from the first method, and
the second method is a method of estimating the turning radius of the straddle-type vehicle on the basis of a detection result of the second sensor stored in the storage device.

* * * * *